Patented June 8, 1937

2,083,065

UNITED STATES PATENT OFFICE 2,083,065

PROCESS FOR TREATING SEEDS, BULBS, TUBERS, AND ROOTS

George Edward Heyl, Mill Hill, England

No Drawing. Application November 30, 1935, Serial No. 52,441. In Great Britain November 19, 1935

7 Claims. (Cl. 47—58)

This invention relates to a process of treating seeds, bulbs, tubers and roots including roots of growing plants, the principal objects being to facilitate growth and/or effect changes in the constitution of the saps of living plants.

According to the present invention the process of treating seeds, bulbs, tubers, or roots including roots of growing plants consists in applying thereto a coating of a composition other than preserved latex containing one or more fertilizers and/or fungicides which is not harmful to plant life and which is adapted to form a water-permeable membrane around the seeds, bulbs, tubers and roots, the composition containing a substance or substances which on passing from the membrane facilitates growth or effects a change in the constitution of the sap of the plant under treatment.

The composition forming the membrane may be an artificially prepared aqueous dispersion of rubber of any desired concentration or a concentrated and/or compounded natural or artificially prepared aqueous dispersion of rubber any of said aqueous dispersions of rubber being vulcanized if desired. Alternatively, the composition may be preserved rubber latex containing one or more substances adapted to impart colours to the saps and/or flowers of growing plants and/or to produce a desired taste and/or smell in the fruits or leaves of the plant, a fertilizing and/or fungicidal character not constituting the principal properties of any of the aforesaid substances.

As another composition for forming the permeable membrane, glue may be employed admixed with the substance or substances as referred to above. When glue is employed it is usually necessary to incorporate therewith a material such as chromic acid which will render the glue substantially insoluble in the soil moisture. Further if desired glycerine may be admixed with the glue in order to render the membrane more elastic.

As another composition for forming the permeable membrane, regenerated cellulose such as viscose, or nitrocellulose or cellulose acetate may be employed admixed with the substance or substances referred to above. If desired the composition employed may be constituted by a suitable combination of the aforesaid materials for instance an aqueous dispersion of rubber as hereinbefore referred to or rubber latex and glue with or without the addition of glycerine, or glue and cellulose derivatives and/or other substances such as drying oils, resins and/or Venetian turpentine or casein and formaldehyde the said combination being adapted to produce the permeable membrane.

The composition may contain one or more fertilizers such as ammonia and cocoanut oil or potassium hydroxide or other alkali and cocoanut oil or other soap-forming oil with or without the addition of ammonia said mixtures being conveniently added in the form of emulsions. A water soluble soap such as potassium oleate may also be employed, if desired, containing a slight excess of potassium hydroxide.

The coating composition may be subjected to the action of ultra-short rays and/or the coated seeds, bulbs, tubers or roots may be similarly treated.

In addition to adding one or more fertilizers to the composition or as an alternative thereto a fertilizer or mixture of fertilizers may be applied to the seeds, bulbs, tubers or roots subsequent to the application of the composition. For instance, a fertilizer may be dusted over the surface of the membrane or a liquid fertilizer may be applied thereto. A particularly suitable fertilizer for application to the seeds, bulbs, tubers or roots, after treatment with the composition consists of a mixture of potassium phosphate and ammonium nitrate. The fertilizer to be employed will vary in accordance with the requirements of the plant or plants to be treated, the nature of the soil or soils and like considerations. Further the strength of the fertilizer will be governed by similar considerations. It has been found that ammoniacal liquor from gas plants may be utilized as a fertilizer and may be incorporated directly with the composition or may be utilized to dilute the aqueous dispersions of rubber hereinbefore referred to.

In addition to fertilizers, fungicides or insecticides or both, may be incorporated in the compositions. If desired either or both of such materials may also be applied to the seeds, bulbs, tubers or roots after the application of the composition. In some cases the fertilizer will at the same time fulfill the function of a fungicide, insecticide or the like. For instance, experiments have shown that the potassium hydrate and cocoanut oil mixture is particularly efficacious in preventing various forms of root disease. This mixture, therefore, has a particular application for use with roots, tubers and the like which are susceptible to such diseases. In many cases it is found that bacteria or insects attack the leaves or flowers of the plant and in some cases particular plants have their own particular pests.

For instance, the boll weevil is the scourge of many cotton plantations; the Colorado beetle particularly attacks potatoes and the common greenfly seems to be attracted by rose trees. In such cases it is desirable to incorporate in the composition a suitable substance which will pass into the sap of the plant and is thought to kill the pests when they attempt to eat the leaves or stems of the plant. For instance, potassium oleate containing a slight excess of potassium hydroxide not only acts as a fertilizer and preventer of root disease, but is quite efficacious in destroying greenfly in the manner described. If desired nitrogen-fixing bacteria such as Clostridium pasteurianum or azotobacter may be added to the compositions.

If desired two or more coatings of the compositions may be applied to the seeds, bulbs, tubers or roots, the two coatings containing, if required, different substances. For instance, the first composition to be applied may contain one or more fertilizers and the second composition may contain one or more fungicides or the like. Thus it may be desired to grow cereals on ground which has already been heavily cropped. This may be accomplished by incorporating in the second coating humus or humus-forming substances such as peat which may if desired be sterilized. Further, when growing plants in ground which contains a great number of weeds a second coating may be applied which consists of or contains a substance capable of destroying any weeds which come into contact with the growing plant. For example, when growing wheat it is sometimes the practice to employ about 110 kilograms of a substance such as cyanamide per acre for destroying weeds. An application of weed killing substances on this scale is not only expensive, but it is both detrimental to horses and to the men spraying the ground. By coating the seeds with cyanamide or with a second layer of composition containing cyanamide these disadvantages may be overcome, and for example, only about 10 kilograms of cyanamide per acre need be employed. The first applied membrane prevents the weed killer having a detrimental effect on the seed, bulb, tuber or root. Again by applying a second layer of composition a substance incorporated in the composition first applied can be prevented from escaping into the surrounding soil. A further application of this "two layer principle" is to include one substance such as a fertilizer in the first coating and a second substance such as a substance to produce a selected colour, taste or the like, in the second coating. It will readily be understood that in this case the first coating must be made sufficiently permeable to enable the substance in the second coating to contact with the seed, bulb, tuber or root.

In some cases it is desirable to grow coloured flowers or plants or to change the normal colours of the flowers or plants. In this event pigments, dyes or the like may be incorporated directly with the composition and/or applied to the seeds, tubers, or roots after the application of the composition thereto. Alternatively, the colour may be obtained or changed by applying coatings of the composition at different stages of the growth of the plant. For instance, a composition containing one substance may be applied to the roots of a plant, the plant then being allowed to grow for a period of time, thus allowing the substance to pass into the sap thereof. Subsequently, a further coating may be applied to the roots of the plant, this second coating containing a different substance, which is adapted to react with the first substance to produce a selected colour in the sap of the plant. For example metallic oxides soluble salts or compounds such as the chlorides of tin, iron and zinc are particularly efficacious when it is desired to cause a colour reaction in the sap of a plant.

It may be desired to impart to a flower, plant or the like a particular smell or again it may be desired to impart to fruit, vegetables or the like a particular taste. In such cases, the desired result may be effected by admixing with the composition a substance adapted to pass into the sap of the plant under treatment. For instance, to impart a desired smell to a plant a suitable member of the essential oils such as lemon oil, oil of Neroli or Rose geranium oil of the terpene series may be employed. It will also be appreciated that the essential oils are applicable for imparting a desired taste to fruit, vegetables or the like, for example, pinene and limonene will produce a lemon taste and smell.

If desired also the composition may contain substances which will change the constitution of fibres produced by the plants. For instance, the composition applied to the roots of a cotton bush may be associated with silk waste in order that the cotton shall absorb sericine and attain a lustre not present in ordinary cotton.

In some cases it is desirable to mix an absorbent substance, such as kieselguhr or other absorbent powder or media which may be powdered colouring material, fertilizer or the like, with the composition in order to cause the composition to adhere to the seeds, bulbs, tubers and roots to which it is applied. Such an application may be utilized to increase the permeability of the membrane with beneficial results. Alternatively or in addition, kieselguhr or the other absorbent powder or media may be applied to the seeds, bulbs, tubers or roots after the application of the coating or coatings of the composition thereto.

If desired the composition can be applied to the seeds, bulbs, tubers or roots in the form of wrappings, that is to say, thin paper or fabrics may be impregnated with the composition and then wrapped around the seeds, bulbs, tubers or roots.

In some cases the membrane of rubber entirely disappears in a relatively short space of time and it would appear that part of the membrane passes into the seed, bulb, tuber or root and the other part passes into the surrounding soil. In other cases the membrane remains behind as a skeleton.

It has been found that by coating seeds, bulbs, tubers, growing roots and the like in accordance with the invention, the use of stable manure and other like manures which are incompletely oxidized may be dispensed with and in consequence the possible change of harmful organisms from such manures gaining access to the sap and entering the leaves or fruit thereby causing illness, is obviated.

It has further been found that by means of this invention the growth of plants such as potatoes, tomatoes and tobacco is materially enhanced, the plants themselves producing larger yields of potato tubers, or alternatively potato tubers of greater size than normal or larger yields of tomato fruit than normally, or larger leaves of tobacco than those of normal size. In some cases, for instance in respect of tomatoes, the quality is enhanced. Particularly striking results have been obtained from what may be termed "third-generation products". Thus for example it has been found that potatoes resulting from a seed potato which has been treated in accordance with this invention are considerably larger in size and number than potatoes obtained from an untreated potato grown under otherwise similar conditions, and that potatoes grown from the second generation of potatoes are still larger in size and number than those of the second generation. It is possible that the fourth generation will also exhibit growth increases. Such results are particularly desirous when foodstuffs such as potatoes, vegetables, cereals, oil-bearing seeds and beans such as soya beans are considered.

It has also been found that plants grown from seeds, bulbs, tubers or roots including plants which have had their roots treated in accordance with this invention are materially strengthened. For instance, it has been found that tropical and semi-tropical plants can be grown in the open in temperate zones. Remarkable results have been obtained in growing tobacco in Great Britain. It has also been found that the coating protects the seeds, bulbs, tubers or roots including the roots of growing plants against the action of frost.

It should be understood that preserved latex containing one or more fertilizers and/or fungicides is excluded from this invention because its application as a coating to seeds, bulbs, tubers and the like forms the subject-matter of my copending application, field August 29, 1935, Serial No. 38,463.

What I claim is:—

1. A process for treating seeds, consisting in applying thereto a coating forming a water-permeable membrane and containing a substance harmless to plant life and adapted to pass into the sap of the plant under treatment in order to alter the properties of the plant in a pre-selected manner.

2. A method of treating seeds, consisting in applying thereto a coating forming a water-permeable membrane and containing a substance harmless to plant life and adapted to pass into the sap of the plant under treatment in order to produce a desired color in the plant.

3. A method of treating seeds, consisting in applying a coating thereto forming a water-permeable membrane impregnated with a substance harmless to plant life and adapted to pass into the sap of the plant to produce a selected taste in the fruit product of the plant.

4. A method of treating seeds, consisting in applying a coating thereto forming a water-permeable membrane impregnated with a substance harmless to plant life and adapted to pass into the sap of the plant to thereby produce a selected odor in the fruit of the plant.

5. A method of treating seeds, consisting in applying thereto a coating of latex impregnated with a substance to pass into the sap of the plant growing from the seeds to alter the properties of the plant.

6. A method of treating seeds, consisting in applying thereto a coating of latex impregnated with a substance to pass into the sap of the plant growing from the seeds to alter the properties of the plant with respect to color.

7. A method of treating seeds, consisting in applying thereto a coating of latex impregnated with a substance to pass into the sap of the plant growing from the seeds to alter the properties of the plant with respect to odor.

GEORGE EDWARD HEYL.